United States Patent
Fiedler et al.

(10) Patent No.: US 10,004,989 B2
(45) Date of Patent: *Jun. 26, 2018

(54) METHODS AND APPARATUS FOR HIDING LATENCY IN NETWORK MULTIPLAYER GAMES

(71) Applicant: Sony Interactive Entertainment LLC, San Mateo, CA (US)

(72) Inventors: Glenn Fiedler, Santa Monica, CA (US); Vincent Napoli, Los Angeles, CA (US); Jason McDonald, Santa Monica, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/607,129

(22) Filed: May 26, 2017

(65) Prior Publication Data

US 2017/0259174 A1    Sep. 14, 2017

Related U.S. Application Data (63) Continuation of application No. 13/753,391, filed on Jan. 29, 2013, now Pat. No. 9,674,267.

(51) Int. Cl.
*A63F 13/34*    (2014.01)
*A63F 13/358*   (2014.01)
(Continued)

(52) U.S. Cl.
CPC ............ *A63F 13/358* (2014.09); *A63F 13/34* (2014.09); *A63F 13/44* (2014.09); *A63F 13/833* (2014.09)

(58) Field of Classification Search
CPC ........ A63F 13/44; A63F 13/52; A63F 13/358; A63F 13/833; A63F 13/34; A63F 13/577; A63F 2300/534; H04L 67/08
See application file for complete search history.

(56) References Cited

U.S. PATENT DOCUMENTS 5,577,180 A    11/1996    Reed
6,415,317 B1    7/2002    Yelon et al.
(Continued)

FOREIGN PATENT DOCUMENTS

EP    1197251 A2    4/2002
EP    1270052 A2    1/2003
(Continued)

OTHER PUBLICATIONS

Brockington, "Client-Side Movement Prediction, Massively Multiplayer Game Development", Charles River Media, Feb. 2003, pp. 293-313.*

(Continued)

*Primary Examiner* — Jasson Yoo
(74) *Attorney, Agent, or Firm* — JDI Patent; Joshua Isenberg; Robert Pullman (57) ABSTRACT

Aspects of the present disclosure describe methods and apparatuses that hide latency during an interaction between an attacking client device platform and a defending client device platform in a multiplayer game played over a network. The attacking client device platform predicts a successful attack will be made and delivers a hit event to the defending client device platform. In order to provide additional time to wait for a hit reply from the defending client device platform the attacking client device platform initiates an altered animation mode that lengthens the run-time of the animation. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

20 Claims, 7 Drawing Sheets

(51) Int. Cl.
*A63F 13/44* (2014.01)
*A63F 13/833* (2014.01)

(56) References Cited

U.S. PATENT DOCUMENTS

| | | | |
|---|---|---|---|
| 6,561,901 | B1 | 5/2003 | Takase |
| 7,187,182 | B2 | 3/2007 | Brillon et al. |
| 9,674,267 | B2 | 6/2017 | Fiedler et al. |
| 2002/0142843 | A1 | 10/2002 | Roelofs |
| 2003/0003977 | A1* | 1/2003 | Takahashi ............ A63F 13/335 463/3 |
| 2003/0028585 | A1 | 2/2003 | Yeager et al. |
| 2003/0177187 | A1 | 9/2003 | Levine et al. |
| 2004/0152519 | A1 | 8/2004 | Wang et al. |
| 2004/0204212 | A1 | 10/2004 | Sato |
| 2004/0224772 | A1 | 11/2004 | Canessa et al. |
| 2005/0021159 | A1* | 1/2005 | Ogawa .................. A63F 13/12 700/91 |
| 2005/0071306 | A1 | 3/2005 | Kruszewski et al. |
| 2007/0265094 | A1 | 11/2007 | Tone et al. |
| 2007/0294387 | A1 | 12/2007 | Martin |
| 2007/0298879 | A1 | 12/2007 | Kobayashi et al. |
| 2008/0287195 | A1 | 11/2008 | Lee et al. |
| 2009/0061989 | A1 | 3/2009 | Kim |
| 2009/0197686 | A1 | 8/2009 | Bergelt et al. |
| 2010/0056275 | A1 | 3/2010 | Wilson et al. |
| 2011/0111859 | A1 | 5/2011 | Fiedler |
| 2012/0059783 | A1 | 3/2012 | Fiedler |
| 2013/0059662 | A1* | 3/2013 | Behmaram-Mosavat ................ A63F 13/45 463/42 |
| 2013/0095931 | A1 | 4/2013 | Fiedler et al. |
| 2013/0143669 | A1 | 6/2013 | Muller |
| 2014/0213367 | A1 | 7/2014 | Fiedler et al. |

FOREIGN PATENT DOCUMENTS

| | | | |
|---|---|---|---|
| EP | 1506491 | A | 2/2005 |
| JP | 2003290557 | A | 10/2003 |
| JP | 2006254945 | A | 9/2006 |
| JP | 2010022492 | A | 2/2010 |
| WO | 1998014886 | | 4/1998 |
| WO | 1999004344 | A1 | 1/1999 |

OTHER PUBLICATIONS

"A dynamic load balancing for massive multiplayer online game server." Lim, ICEC 2006, LNCS 4161, pp. 239-249, 2006.
"A dynamic load balancing model for the multi-server online game systems." Chen 2004 citeseer.
Bernier "Latency Compensating Methods in Clientl Server in game Protocol Design and Optimization", Proc. Game Developers Conference (Online), Mar. 20, 2001-Mar. 24, 2001, 13 pages; www.gamasutra.com/features/gdarchive/200I/bernier.doc.
Brockington, "Client-Side Movement Prediction, Massively Multiplayer Game Development", Charles River Media, Feb. 2003, pp. 293-31 3.
Co-Optimus. Borderlands Co-OP Review. Nov. 2, 2009 (Nov. 2, 2009) [retrieved on Dec. 11, 2012]. Retrieved from the internet:,URL:http://www.co-optimus.com/review/311/page/1/borderlands-co-op-review.html . . . pp. 1-2.
Final Office Action for U.S. Appl. No. 12/614,977, dated Jan. 31, 2013.
Final Office Action for U.S. Appl. No. 12/876,000, dated Jul. 19, 2013.
Final Office Action for U.S. Appl. No. 13/753,391, dated Nov. 17, 2016.
Fujimoto, "7.4 Distributed Interactive Simulation, Parallel and Distributed Simulation Systems", John Wiley & Sons, Jan. 2000, pp. 199-209.
International Search Report and Written Opinion for International Application No. PCT/US2010/038296, dated Aug. 30, 2010.
International Search Report and Written Opinion for International Application No. PCT/US2012/059371, dated Jan. 22, 2013.
International Search Report and Written Opinion for International Application No. PCT/US2014/012815, dated Jun. 10, 2014.
International Search Report and Written Opinion for International Application No. PCT/US2014/012815, dated Aug. 13, 2015.
International Search Report and Written Opinion for International Application No. PCT/US2014/012815, dated Oct. 19, 2016.
Korean Office Action for KR Application No. 10-2015-7020669, dated May 16, 2016.
Non-Final Office Action for U.S. Appl. No. 12/614,977, dated Dec. 6, 2011.
Non-Final Office Action for U.S. Appl. No. 12/876,000, dated Mar. 15, 2013.
Non-Final Office Action for U.S. Appl. No. 12/876,000, dated Nov. 22, 2013.
Non-Final Office Action for U.S. Appl. No. 13/753,391, dated Feb. 10, 2014.
Non-Final Office Action for U.S. Appl. No. 13/753,391, dated Sep. 4, 2014.
Non-Final Office Action for U.S. Appl. No. 13/753,391, dated May 18, 2016.
Notice of Allowance for U.S. Appl. No. 12/876,000, dated Mar. 21, 2014.
Notice of Allowance for U.S. Appl. No. 13/753,391, dated Jan. 31, 2017.
Russel, "Artificial Intelligence a Modern Approach" Second Edition, The Intelligent Agent Book, Prentice Hall Series in Artificial Intelligence, 1169 pgs.
Yu et al. "MOPAR: A Mobile Peer-to-Peer Overlay Architecture for Interest Management of Massively Multiplayer Online Games" Jun. 15, 2005.
Office Action dated Nov. 30, 2017 for Chinese patent application No. 201480006626.1.

* cited by examiner

METHODS AND APPARATUS FOR HIDING LATENCY IN NETWORK MULTIPLAYER GAMES

CLAIM OF PRIORITY

This application is a continuation of U.S. patent application Ser. No. 13/753,391 filed Jan. 29, 2013, the entire contents of which are incorporated herein by reference for all purposes.

FIELD OF THE DISCLOSURE

The present disclosure is related to multiplayer games and, more particularly, to methods for hiding latency in network multiplayer games.

BACKGROUND OF THE INVENTION

Real-time multi-user distributed applications, such as online multiplayer games, are becoming increasingly popular due to the proliferation of broadband Internet access. Even as online multiplayer gaming increases in popularity, there are still many drawbacks that need to be addressed. One of the major drawbacks relates to the network performance and data transfer speeds that may drastically influence the gaming experience.

Online multiplayer games allow players in widely distributed geographical locations to play the same game within the same game environment at the same time. The multiplayer feature allows players to enjoy interaction with other individuals, whether it is in the form of partnership, competition, or rivalry, and also provides players with a form of social communication. In a variety of different online multiplayer game types, players may individually compete against two or more human contestants, work cooperatively with a human partner(s) in order to achieve a common goal, supervise activities of other players, or engage in a game that incorporates any possible combination of the above.

Currently each online multiplayer game application deals with network performance such as network bandwidth. However, there can be limitations in the quality and bandwidth of networks established or used during the play in an online multiplayer game. These limitations may lead to delays in data transmission and thus cause slow or discontinuous animation of the gameplay. For example, in melee combat based games, when a first player attacks a second player, there can be latency in transmission of data from the first player computer to the second player computer, which may lead to an inconsistency in gameplay animation. The delayed animation may affect the timing of players' reactions. As a result, players may feel the game is unfair. For example, on the first player side, an avatar controlled by the first player may swing a club at an avatar controlled by a second player, before the avatar controlled by the second player was able to block the club with a shield. However, on the second player side, when the avatar controlled by the first player began swinging the club, the second player's avatar had already raised his shield, but was killed anyway, since on the first player side, he was still unprotected.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Aspects of the present disclosure describe apparatuses and methods for hiding the latency in a multiplayer game played over a network. The multiplayer game may comprise an attacker and a defender. The attacker may be playing the game on a first client device platform, and the defender may be playing the game on a second client device platform. Both client device platforms may be connected over a network. According to aspects of the present disclosure, the attacker may initiate one or more attacking animations. The first client device platform may predict that the one or more attacking animations will result in a successful hit on the defender. When a positive prediction is made, the attacker's client device platform may generate a hit-event. The hit-event may comprise the one or more initiated attack animations, and a unique hit identifier (ID) that will be used to track the results of the one or more attack animations. The hit-event may then be stored in a hit table on the attacker's client device platform and delivered to the defender's client device platform over the network connection. The playback rate of the one or more attack animations may be slowed down on the attacker's client device platform in order to lengthen the available time in which the attacker's client device platform may receive a response from the defender's client device platform to indicate whether the attack was indeed a successful one as predicted.

Upon receiving the hit-event, the defender's client device platform stores the information in a hit table and then determines if the one or more attack animations result in a successful attack on the defender. By way of example, the defender's client device platform may determine that the attack was a hit, a miss, or a blocked attack. The defender's client device platform then generates a hit-response that comprises the appropriate one or more response animations and the same hit ID that was associated with the hit event. The hit-response is stored in the hit table and is also delivered to the attacker's client device platform over the network connection. Once received by the attacker's client device platform, the hit response is stored on the attacker's hit table as well. The attacker's client device platform may then execute the reply animations that were identified in the hit-reply.

Aspects of the present disclosure describe how the apparatuses and methods respond to differences in the length of the latency. Before the hit-event is delivered by the attacker's client device platform, the attacker does not know how long the latency will be, and therefore needs to be able to accommodate any potential outcome. The following steps implemented by the attacker's client device platform depend on whether the hit-reply is received by the attacker: (1) during a pre-hit period; (2) after the pre-hit period; or (3) after an extended hit-pause period (or never received).

According to instances of the present disclosure if the hit-response is received during the pre-hit period the attacker's client device platform buffers the response animations for playing at the point of impact between the attacker and the defender. According to certain instances of the present disclosure if the hit-response is received after the pre-hit period, the attacker's client device platform may implement an extended hit-pause period that may last for a predetermined length of time. This allows for more time to allow the hit reply to be received by the attacker's client device platform. Once the attacker's client device platform has received the hit reply, it may be stored in the attacker's hit table and the reply animations may be implemented after at least the standard hit-pause period has been completed.

According to certain instances of the present disclosure if the hit response has not been received before the predetermined maximum length of time, the attacker's client device platform may timeout. When the attacker's client device platform times out, all data in the hit table relating to the hit ID that did not receive the hit reply may be removed. Additionally, the reply animation may be replaced with a timeout animation. The timeout animation may depict a missed attack.

Aspects of the present disclosure further describe apparatuses and methods that provide seamless animation during the transition between the one or more attack animations and the one or more reply animations. This is critical because the attacking machine and the defending machine may execute the animations at different times due to the latency between the machines. In order to ensure that the attacker's animations remain in phase with the defender's animations, the attacker's client device platform utilizes information from the attacker's hit table. First, upon reading the table, if the client device platform detects that he should be in a hit-pause period as a result of any hit-event, then the client device platform will insert a pause at the first frame of the reply animation. Thereafter, the pause will be ended (and the reply animation will resume once the attacker's client device platform determines that both: (1) the hit-pause is complete according to the attacker's client device platform; and (2) the attacker's client device platform has received an indication that the defender is un-paused as well.

In other words, the reply animation is buffered and played on both attacker and defenders machine at the point of impact, e.g. the end of pre-hit, if it is available. The reply animation may remain paused on the first frame of this animation in the common case. The reply animation may then "unpause" after the hit reply and resume playing. This is important since game may look considerably worse if the hit reply animation does not have the first frame play at the point of hit.

Additional aspects of the present disclosure describe similar apparatuses and methods as described above with the addition of an observer, and an observer's client device platform. The addition of the observer requires that the hit-event and the hit reply be sent to the observer as well. Additionally, the observer may implement a seamless transition between the attacking animations and the reply animations in a manner substantially similar to that of the attacker's client device platform.

Figure 1:
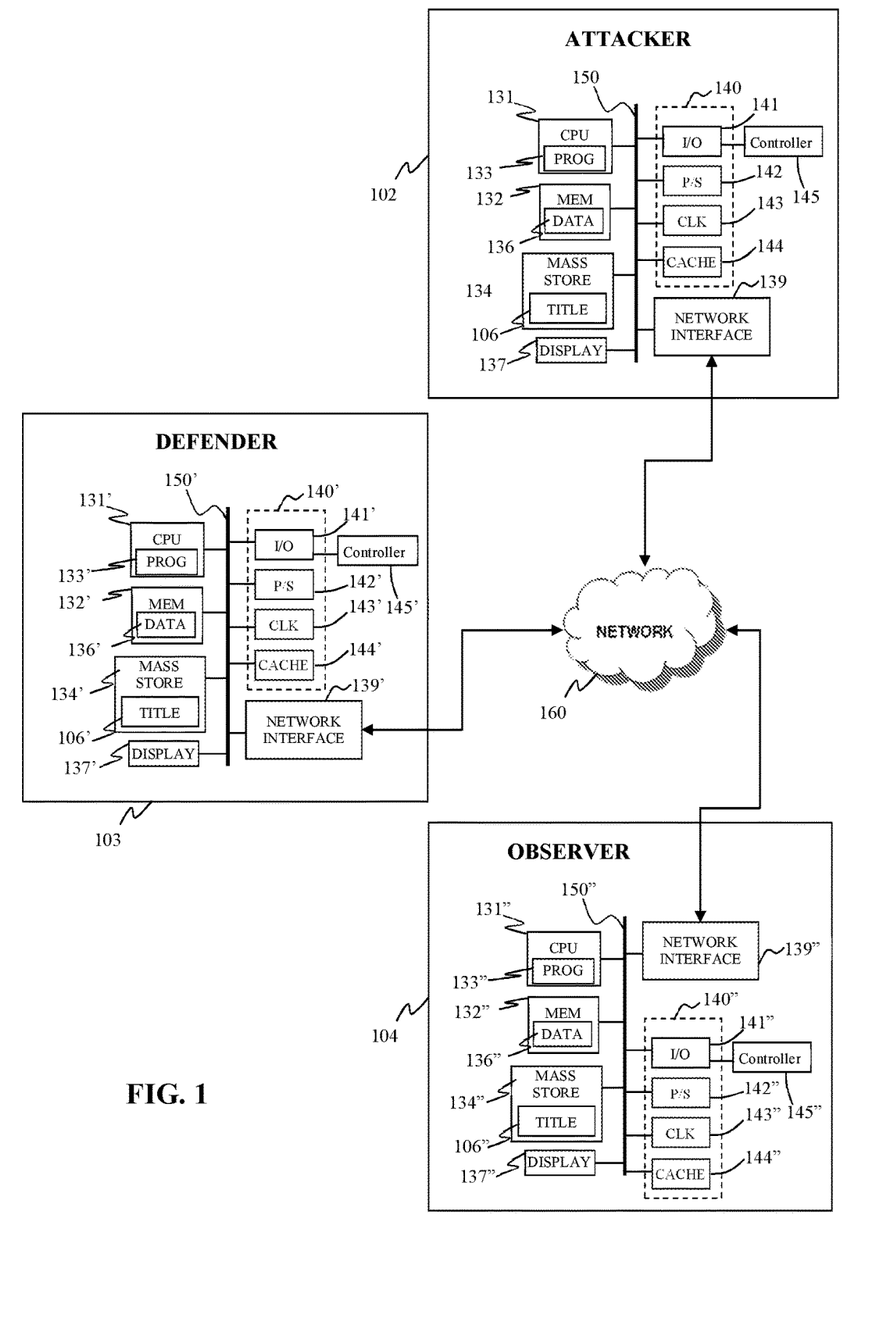
FIG. 1 is a schematic diagram of client device platforms for an attacker, a defender, and an observer communicating over a network according to an aspect of the present disclosure.

FIG. 1 is a block diagram depicting three different client device platforms 102, 103, and 104 that may be able to communicate with each other over a network 160. Each client device platform may be used by one or more game players at any given time. For simplicity, aspects of the present disclosure will depict each client device platform as having a single game player, but it should be evident to one of ordinary skill in the art that two or more players may be playing the game from a single client device platform. According to FIG. 1 there is a client device platform 102 that is associated with an attacking player, a client device platform 103 associated with a defending player, and a client device platform 104 associated with an observing player. As used herein, client device platform 102 may be referred to as the "attacker", client device platform 103 may be referred to as the "defender", and client device platform 104 may be referred to as the "observer". In instances where two or more game players are playing on a single client device platform, the labels "attacker", "defender", and "observer" may be specific to the individual game players and not used to define the client device platform as a whole.

The attacking player's platform 102 may include a central processor unit (CPU) 131. By way of example, a CPU 131 may include one or more processors, which may be configured according to, e.g., a dual-core, quad-core, multi-core, or Cell processor architecture. Attacker 102 may also include a memory 132 (e.g., RAM, DRAM, ROM, and the like). The CPU 131 may execute a process-control program 133, portions of which may be stored in the memory 132. The attacker 102 may also include well-known support circuits 140, such as input/output (I/O) circuits 141, power supplies (P/S) 142, a clock (CLK) 143 and cache 144. The attacker 102 may optionally include a mass storage device 134 such as a disk drive, CD-ROM drive, tape drive, or the like to store programs and/or data. The attacker 102 may also optionally include a display unit 137. The display unit 137 may be in the form of a cathode ray tube (CRT) or flat panel screen that displays text, numerals, or graphical symbols. A controller 145 may be connected to the attacker 102 through the I/O circuit 141 or it may be directly integrated into the attacker 102. The controller 145 may facilitate interaction between the attacker 102 and a game player who may control the gameplay. The controller 145 may include a keyboard, mouse, joystick, light pen, hand-held controls or other device. The attacker 102 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The attacker 102 may send and receive data and/or requests for files via one or more data packets over the network 160.

The attacker's platform 102 may access a game program 106 that has a multi-player functionality. There may be more than one game program 106 stored in the attacker 102. The game programs may be stored in the memory 132 or in the mass storage device 134. Additionally, one or more game programs 106 may be stored at a remote location accessible to the attacker 102 over the network 160. Each game program 106 contains executable game code that is used by the CPU 131 to generate animations in response to inputs provided by the game player.

The preceding components may exchange signals with each other via an internal system bus 150. The attacker 102 may be a general purpose computer that becomes a special purpose computer when running code that implements embodiments of the present invention as described herein. By way of example, and not by way of limitation, the attacker 102 may be Sony Computer Entertainment's PlayStation 3 console, a PlayStation Vita hand-held console, a home computer, a cellular phone, or any other similar device capable of playing multi-player video games over a network.

The defending player's platform 103 may be a device substantially similar to that of attacker 102. Elements of the defending players platform 103 that correspond to like elements of the attacker's platform 102 are denoted by the same reference numeral with a single prime (') appended. However, it should be noted that the specific embodiments may be different, e.g., the attacker's platform 102 may be a PlayStation 3 console, and the defender's platform 103 may be a PlayStation Vita hand-held console. Additionally, the observer's platform 104 may be a device substantially similar to the defender's platform 103 and the attacker's platform 102. Elements of the observer's platform 104 that correspond to like elements of the attacker's platform 102 are denoted by the same reference numeral with a double prime (") appended. Again, the specific embodiments of the observer's platform 104 may differ from those of the attacker 102 and the defender 103. While FIG. 1 only depicts three client device platforms, one each of the attacker 102, defender 103, and observer 104, additional aspects of the present disclosure include systems with a larger or smaller number of client device platforms. By way of example, and not by way of limitation, there may only be an attacker 102 and a defender 103 when there are only two game players playing the game 106, there may be two or more observers 104 who are each observing the interactions between the attacker 102 and the defender 103, there may be multiple defenders 103 if an attacker 102 is attacking multiple opponents at the same time, there may be multiple attackers 102, if a defender 103 is being attacked by two or more opponents at the same time, or any combination thereof.

Aspects of the present disclosure allow for peer-to-peer gaming. Each client device platform may be associated with an avatar, i.e., the attacker 102 is associated with an attacker avatar, the defender 103 is associated with a defender avatar, and the observer 104 is associated with an observer avatar. Each client device platform may deliver state and event information associated with their respective avatars to the other client device platforms. By way of example, and not by way of limitation, the state information may include positions and movements of the avatar. By way of example, and not by way of limitation, the event information may include attack animations, such as swinging a club or punching, defensive animations, such as blocking or other evasive maneuvers, and reply animations that result from a successful attack, such as falling to the ground or being shoved backwards. The state and event information may be delivered by each client device platform at normal intervals, such as 30 packets per second. When displaying the gameplay on their respective display units 137, a client device platform will utilize the state and event information to display proxies of the other avatars. For example, the attacker's avatar may be displayed on the attacker's display unit 137 according to the state and event information generated by the attacker 102, and the proxy avatars for the observer avatar and the defender avatar may be displayed on the attacker's display unit 137 in accordance with the state and event data that has been broadcast to the attacker 102 from the respective client device platforms for the observer 104 and defender 103.

Figure 2A:
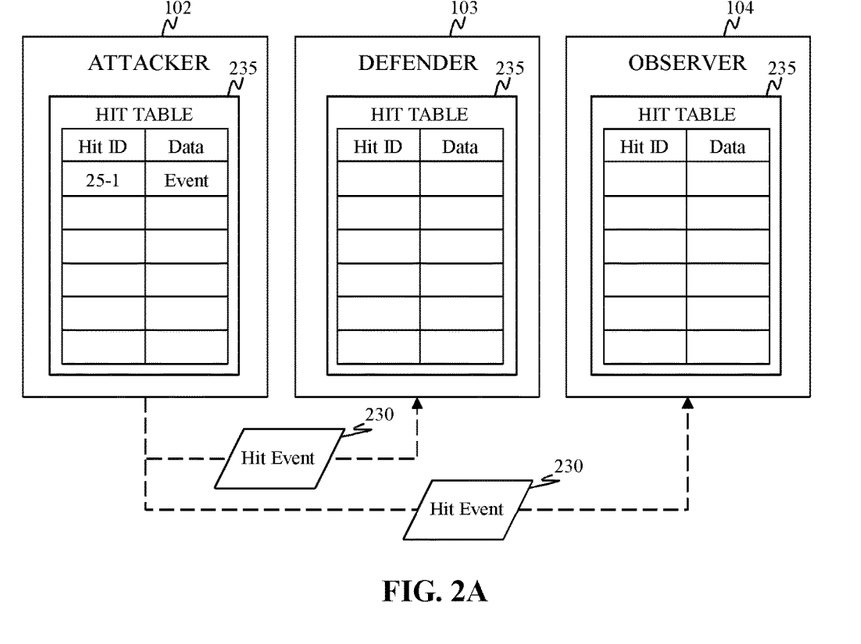
FIGS. 2A-2C are block diagrams that depict the storage and transfer of hit events and hit replies between the client device platforms for the attacker, the defender, and the observer.
Figure 2B:
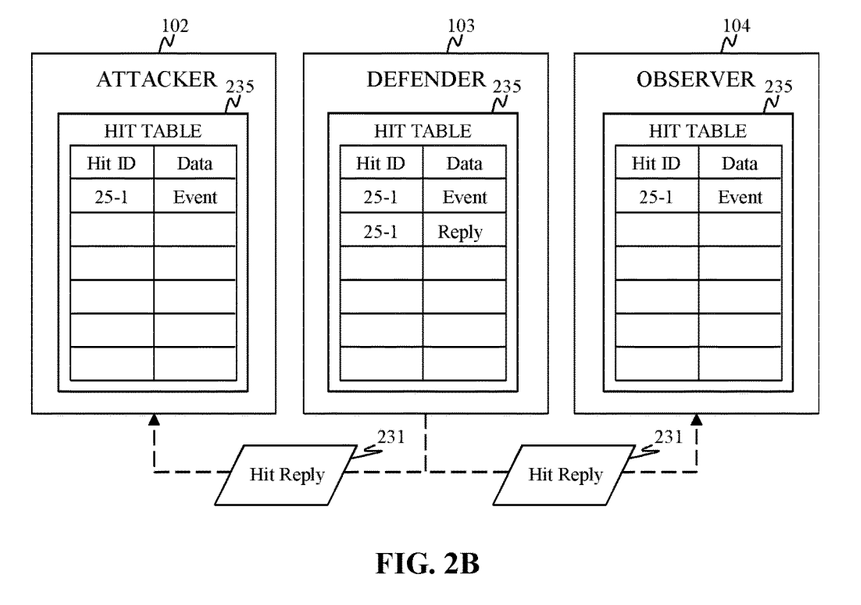
Figure 2C:
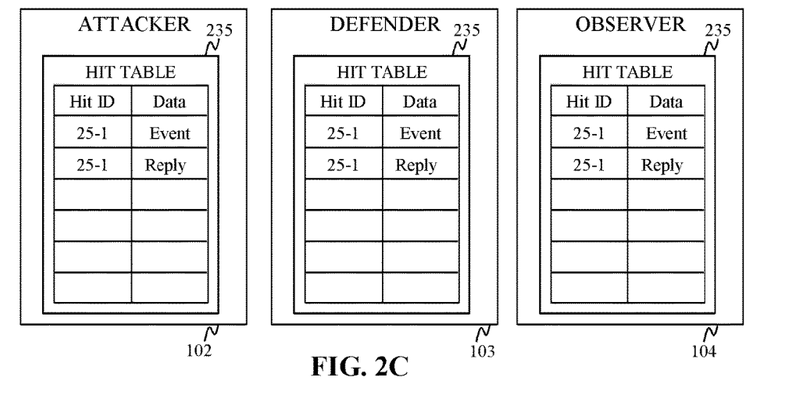

Specifically, with respect to aspects of the present disclosure, event information related to attack animations and reply animations are discussed. Hiding the latency in the delivery of these events allows for gameplay that is fair to the game players and allows for more seamless animations. FIGS. 2A-2C are block diagrams that depict how hit events 230 and hit replies 231 are delivered and stored by the respective client device platforms 102, 103, and 104.

A hit event 230 may be generated by an attacker 102 once the attacker predicts that the one or more animations will likely result in a successful attack. In general the prediction of a successful attack may be made by looking ahead in the animation to determine whether or not the attacker will connect with any of the collision volumes on the attacker. By way of example, the prediction may be made by assuming that the positions of the attacker and defender are stationary. From this starting assumption, the future path of the attacker's weapon, such as, but not limited to, a sword, a club, or a fist, is determined to see if at any frame after the initiation of the animation, there will be a collision between the attacker and the defender. The attack animation may be advanced frame-by-frame from a current time to a pre-hit time and at each frame the attacker's platform 102 may check for prediction of the collision with the defender. Hit events 230 may comprise the one or more attack animations that are predicted to result in a successful attack and a corresponding hit identification (ID). The hit ID is a unique identifier that may be used by each of the client device platforms 102, 103, and 104 to track the animations. In order to provide a unique identification, the hit ID may comprise an 8-bit random access memory (RAM) component and an 8-bit modulo component. The first hit event 230 may have a modulo component of "1" and each subsequent hit event 230 may be incrementally increased by 1. By way of example, a series of hit IDs may be {RAM-1, RAM-2, RAM-3, RAM-4 . . . }, where RAM is a random 8-bit number.

In FIG. 2A the attacker 102 has predicted that one or more actions of the attacker's avatar will likely result in a successful attack on the defender's avatar. Therefore, a hit event 230 has been generated. The hit event is stored in a hit table 235 located in the attacker 102. By way of example, the hit table 235 may be located in the memory 132. The hit table 235 is used to associate the hit event 230 with a hit reply 231 that may be received from the defender 103 in the future. Additionally, the attacker 102 delivers the hit event 230 to the defender 103 and he observer 104 over the network 160, as indicated by the dashed arrows.

In FIG. 2B the observer 104 and the defender 103 have received the hit event 230 and stored it in their respective hit tables 235. The observer 104 should preferably receive and store the hit event 230 in order for the observer 104 to properly display the attack and response animations on its display unit 137". The information stored in the observer's table 235 will indicate when animations, such as a hit pause should be initiated and ceased.

In addition to storing the hit event 230 in its hit table 235, the defender 103 may also resolve whether the one or more attack animations correspond to a successful attack. The problem of defenders 103 being harmed when they were already protected from an attack, as may be the case in the prior art, is prevented by resolving the success of an attack on the defender 103. Instead of relying on proxy information that may not reflect the most recent position of the defender's avatar (as might occur if the attack was resolved by the attacker 102) the one or more attack animations are resolved using the most current state and event information available to the defender 103. After resolving the attack, the defender 103 may generate a hit reply 231. The hit reply 231 is stored in the defender's hit table 235 and is also delivered over the network to the attacker 102 and the observer 104. The hit reply may comprise information identifying one or more reply animations and the same hit ID that was associated with the hit event 230. The one or more reply animations will correspond to the result of the attack. For example, if the one or more attack animations were determined to result in a successful attack, then the one or more reply animations may include animations that show the defender's avatar falling to the ground or being knocked backwards. Alternatively, if the attack was determined to be unsuccessful, the reply animation may include the defender's avatar blocking the attack, or avoiding the attack altogether. Since the hit event 230 is resolved immediately upon receipt by the defender 103, any blocking or avoidance actions initiated by the defender 103 after the receipt will not alter the result of the attack. The hit event 230 may be received before there is contact between the attacking and defending avatars, and therefore, it may be desirable to disable subsequent blocking or avoidance animations of the defender's avatar once the hit event 230 has been received. This will prevent the game player controlling the defending avatar from feeling like they were hit even though they were in the middle of a blocking motion.

In FIG. 2C the attacker 102 and the observer 104 have received the hit reply and have stored the data in their respective hit tables 235. The attacker 102 and the observer 104 may now be able to display the entire interaction between the attacker's avatar and the defender's avatar. The transmission of the hit event 230 and the receipt of the hit reply 231 must take place before the attack animation initiated by the attacker 102 has been completed in order for the animation to appear seamless. When latency is large enough that the data cannot make a round trip between the attacker 102 and the defender 103 before the attack animation is completed, the game play suffers. Therefore, the ability to hide the latency allows for improved gameplay in a multiplayer setting.

Figure 3A:
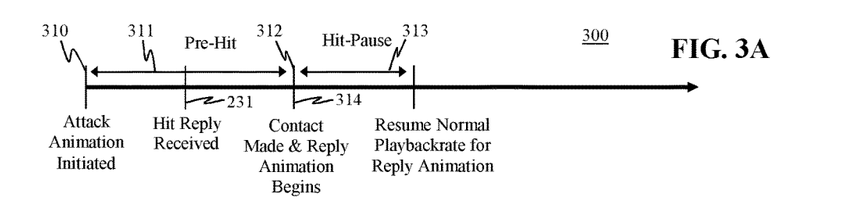
FIG. 3A is a timeline that depicts the different periods that occur during an attack animation that does not utilize any adjusted animation modes.
Figure 3B:
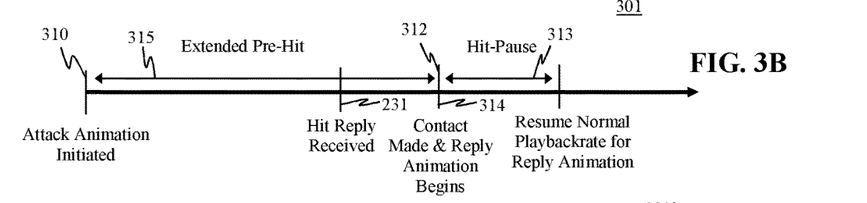
FIGS. 3B-3D are timelines that depict different periods that occur during an attack animation that include one or more adjusted animation modes according to various aspects of the present disclosure.
Figure 3C:
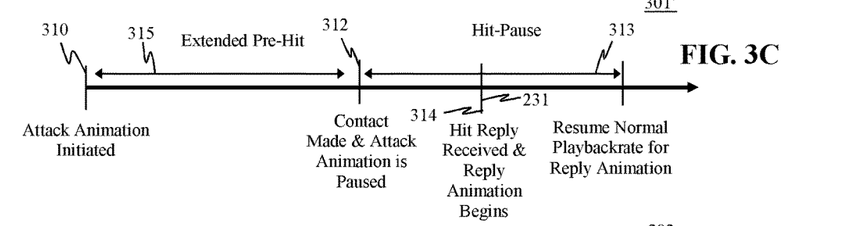
Figure 3D:
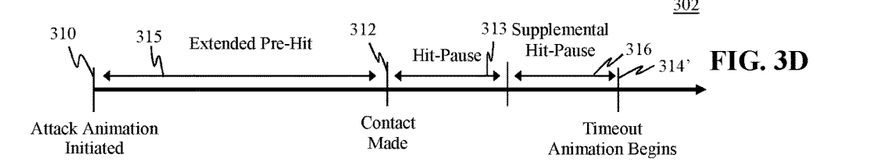

Aspects of the present disclosure hide latency with the use of one or more animation alteration modes. FIG. 3A is a standard attack timeline 300 in a system that does not utilize latency hiding techniques. FIGS. 3B-3D depict examples of extended attack timelines 301, 301', and 302 that utilize altered attack animation modes in order to hide latencies according to aspects of the present disclosure. It should be noted that the timelines depicted in FIGS. 3A-3D are not to scale. In FIG. 3A, the standard timeline 300 begins when one or more attack animations are initiated at 310. By way of example, an attack animation may be when an avatar controlled by the attacker 102 begins swinging a club at an avatar controlled by the defender 103. The time period after the attack animation has been initiated at 310 and before contact between the attacker's avatar and the defender's avatar is made at 312 is defined as the pre-hit period 311. The pre-hit period 311 may be a variable length of time depending on factors such as, but not limited to, weapon type, distance between avatars, power of the attack, strength of the attacking avatar, or any combination thereof. By way of example, and not by way of limitation, the pre-hit period 311 may be approximately 100 ms. In this case, where no latency hiding techniques are implemented, the hit reply 231 is received by the attacker 102 before the end of the pre-hit period 311. Once the hit reply 231 has been received, a reply animation 314 is buffered so it may be initiated once the contact point 312 has been reached. The playback rate of the first frame of the reply animation 314 may be substantially reduced or even paused for a brief period of time in order to produce a hit-pause effect. The length of the hit-pause effect is considered the hit-pause period 313. The hit-pause period 313 may be a variable length of time depending on factors such as, but not limited to, weapon type, distance between avatars, power of the attack, strength of the attacking or defending avatar, size of the attacking or defending avatar, or any combination thereof. By way of example, and not by way of limitation, the playback rate of the first frame of the reply animation may be slowed down to a small but non zero value, e.g., to about $1/1000$ of normal speed. After the end of the hit-pause period 313, the reply animation 314 may resume a normal playback rate. In an ideal case the hit reply animation may be initiated on attacker and observer machines at the point of hit, e.g., at end of the pre-hit but before hit pause.

FIG. 3B depicts an extended attack timeline 301 that incorporates an altered animation mode according to aspects of the present disclosure. Timeline 301 is substantially similar to that of the attack timeline 300 with the exception that the pre-hit period 311 is replaced with an extended pre-hit period 315. The extension of the pre-hit period 311 provides additional time for the attacker 102 to receive the hit reply 231 before contact between the attacker's avatar and the defender's avatar is made at 312.

The extended pre-hit period 315 is substantially similar to pre-hit period 311 with the exception that the playback rate of the extended pre-hit period 315 is slowed down compared to the playback rate of the pre-hit period 315. As the playback rate of the extended pre-hit period is decreased, the amount of latency that may be hidden is increased. However, decreasing the playback rate of the extended pre-hit period 311 too much may result in attack animations that appear sluggish and unresponsive to the game player. The limit of how much the playback rate of the extended pre-hit period 315 may be reduced is dependent on the type of game, and the expectations of the players playing the game. By way of example, in a combat type game the playback rate of the extended pre-hit period 315 may be approximately two-thirds of the playback rate of the pre-hit period 311 without the animations appearing sluggish and unresponsive. As such, a pre-hit period 311 that lasts 100 ms may have an extended pre-hit period 315 that lasts approximately 150 ms. Ideally, the additional 50 ms is sufficient to provide time to receive the hit reply 231 before the contact between the attacker's avatar and the defender's avatar is made at 312.

However, if the hit reply 231 is not received before the contact point 312, then the hit-pause period 313 may also be used as an additional length of time to hide the latency as shown in FIG. 3C. Before entering into the hit pause period 313, the attack animation 310 may be paused at or just prior to the contact point 312. At some point into the hit-pause period 313 the hit reply 231 may be received. Once received, the reply animation 314 may be initiated at a reduced playback rate, such as a playback rate of about $1/1000$ of normal speed. The reduced playback rate during hit pause is sufficiently slow that the animation is effectively "paused". For example, slowing the animation to one-half of normal speed may be too fast. A playback rate greater than zero (e.g., $1/1000$ of the normal rate) is desirable so long as it is slow enough that the animation is practically paused. However, a very slow (as opposed to zero) rate of playback may be desirable for visual effect. A slowed animation may look better than one that is completely stopped. After the hit-pause period 313 has ended, the reply animation 314 may continue at the normal playback rate.

It is noted that during the hit pause period the animation o the defender platform 103 may also freeze. The defender may also play a hit reply animation, e.g., corresponding to "getting hit" or "blocking" and the first frame of the defender's reply animation may freeze (e.g., timescale at $\frac{1}{1000}$ normal speed, as with the attack animation) for visual impact during the hit pause period.

Extended timeline 302 in FIG. 3D provides an additional aspect of the present disclosure that provides even more time for hiding the latency if the hit reply 231 has not been received by the end of the hit-pause period 313. In this circumstance, the altered animation mode may further comprise a supplemental hit-pause period 316. The supplemental hit-pause period 316 extends the length of the original hit-pause period 313 in order to allow for additional time for the hit reply 231 to be received by the attacker 102. The supplemental hit-pause period 316 may be an unlimited amount of time. In this case, the supplemental hit-pause period may be not end until the hit reply 231 is received. However, if the amount of time used for the supplemental hit-pause 316 is too great, the gameplay may become overly sluggish and unresponsive. Typically, the supplemental hit-pause 316 may provide an additional 200-300 ms before the pause becomes too distracting to the game player. If by the end of the supplemental hit-pause period 316, there still has not been a hit reply 231, then the attacker 102 may assume that a hit reply 231 will never come. In this instance, the attacker 102 may timeout. When the attacker 102 timeouts, the attacker will erase all data in its data table that corresponds to the hit ID that was not responded to and unpause from the supplemental hit-pause period 316. At the unpause, a timeout animation 314' may be initiated. By way of example, and not by way of limitation, the timeout animation 314' may be a continuation of the attack animation resulting in a missed attack.

An additional aspect of the present disclosure involves the process of exiting the hit-pause period 313 (or, if needed, the supplemental hit-pause period 316) in a manner that allow for the reply animation for both the attacking and defending avatars to be synchronized. Due to the latency that has been hidden, there may be instances where the defender 103 initiates the reply animation period 314 before the attacker 102 or the observer 104 initiates the response animation period 314. In such situations, the proxy avatar of the defender 103 may be shown as moving on the attacker's display unit 137 before the attacker's avatar has begun the reply animation period 314. This scenario creates a disjointed animation and is undesirable. In order to ensure that the transition from the hit-pause period 313 (or the supplemental hit-pause period 316) to the reply animation period 314 occurs at the same time for both the local avatar and the proxy avatar, the client device platform should not make the transition until it has received confirmation that both the attacker's avatar and the defender's avatar have reached the transition point.

From the perspective of the defender 103 the determination of when to un-pause from and begin the reply animation period 314 is relatively simple. If the defender 103 determines that an attack has been successful, and the one or more attack animations included in the hit event 230 include an instruction to implement a hit-pause period 313, then the defender 103 will initiate the hit-pause period 313. There is no need to add in a supplemental hit-pause period 316 because there is no latency that needs to be hidden, because no additional information is needed by the defender 103 to initiate the reply animation. Once the hit-pause period 313 is completed, the defender 103 may initiate the reply animation period 314 for both the local avatar (i.e., the defender's avatar) and the proxy avatar (i.e., the attacker's avatar).

In order for the attacker 102 to determine if it can make the transition from the hit-pause period 313 (or the supplemental hit pause period 316) to the reply animation period 314 the attacker 102 needs to know that both: (1) the state and event information in the attacker's hit table 235 indicates that the defender's proxy avatar is no longer in the hit-pause period 313; and (2) that the attacker 102 is no longer in the hit-pause period 313 or a supplemental hit-pause period 316. If either one of the two conditions is not met, then the attacker 102 must remain paused. Therefore, the transition from the hit-pause period 313 to the reply animation period 314 may occur as a result of two separate scenarios.

According to the first scenario, the attacker 102 may determine that the hit-pause period 313 for his avatar has been exceeded and is awaiting a response from the defender 103 that indicates that the defender's avatar has exited the hit-pause period 313 as well. The indication that the defender's avatar has exited the hit-pause period 313 may be delivered as part of the state information that is broadcasted to each client device platform. Once the attacker 102 receives an update that indicates the defender's avatar has un-paused, then the attacker 102 may un-pause as well. The first scenario typically occurs when the hit reply 231 is received before the end of the extended pre-hit period 315.

The second scenario typically occurs when the attacker 102 needs to add a supplemental hit-pause period 316 in order to allow for a longer latency. In this situation, the defender 103 may have already transitioned from the hit-pause period 313 to the reply animation period 314. Even though the defender 103 may be broadcasting to the other client device platforms that he is un-paused, the defendant's proxy avatar displayed on the attacker's display unit 137 may be kept in a frozen state because the attacker 102 has not yet received the updated state information in the hit reply 231 due to latencies in the system. Additionally, while in a hit-pause period the attacker 102 may ignore normal position updates broadcast from the defender 103. Therefore, the defender's local avatar (i.e., the position of the defender's avatar as displayed on the defender's display unit 137') may have already begun moving backwards, even though the defender's proxy avatar (i.e., the position of the defender's avatar as displayed on the attacker's display unit 137) is still frozen. The transition to the reply animation period 314 may then be made once the attacker 102 receives an update that the hit-pause period 313 is completed according to the information in his hit table 235. When the attacker 102 finally does make the transition to the reply animation period 314, the defender's local avatar and the defender's proxy avatar may be in different positions. Therefore, the attacker 102 may implement one or more actions in order to unite the locations of the defender's proxy avatar and the true position of the defender's local avatar. By way of example, and not by way of limitation, after the attacker 102 has completed the supplemental hit-pause 316, the attacker 102 may interpolate a trajectory from the incorrect position (i.e., where the defender's proxy avatar is located during the hit-pause) that will quickly cause the proxy avatar of the defender to converge with the location and trajectory of the defender's local avatar. The conditions needed for making the transition from the hit-pause period 313 to the reply animation period 314 with respect to the observer 104 are substantially similar to that of the attacker 102.

While in hit pause on all machines for which the defender is a remote proxy object (attacker and observer machines), normal position updates from the defender machine may be ignored while hit paused. Then when the hit pause is completed, the normal interpolation from the current position to the newly updated position quickly interpolates from the incorrect position, back into the trajectory that the defender has been put on as a result of the outcome of the attack. This may be implemented by a physical position update where we tween the paused position to the path of the defender resulting from the hit. Position updates are commonly used in game a to synchronize player movement. Basically, on the defenders machine, the defender has already reacted to the hit. On the attacker's machine the defenders reaction is delayed until the attacker's machine unpauses. As an illustration of this, imagine a baseball bat hitting a baseball crisply. The baseball (defender) is already flying in the air from the baseball's point of view. The baseball is kept frozen on the bat at the batter's (attacker's) machine until the batter's machine is ready to unpause the hit pause. Then as the baseball flies through the air on the batter's machine the baseball's position is interpolated such that it rapidly converges with the path of the baseball already flying through the air on the baseball's machine.

The previously described mechanisms for transitioning from a hit-pause period 313 (or a supplemental hit-pause period 316) to the reply animation period 314 also apply when there are multiple hit events 230 and hit replies 231 outstanding. In many multi-player games a single game player may be both an attacker and a defender at any given time, or they may be attacked by a plurality of other players at the same time. Therefore, when determining whether to make the transition from a hit-pause period 313 to a reply animation period 314, it is important to analyze all outstanding hit-pause periods 313 and supplemental hit-pause period 316. For example, if you are an attacker 102 who has delivered a single hit event 230 to a defender 103, but the defender 103 has been attacked by other players at approximately the same time, then you may need to wait until the defender 102 has indicated that they have exited all of the hit-pauses from the proximate attacks before you exit the hit pause period 313 as well.

Figure 4:
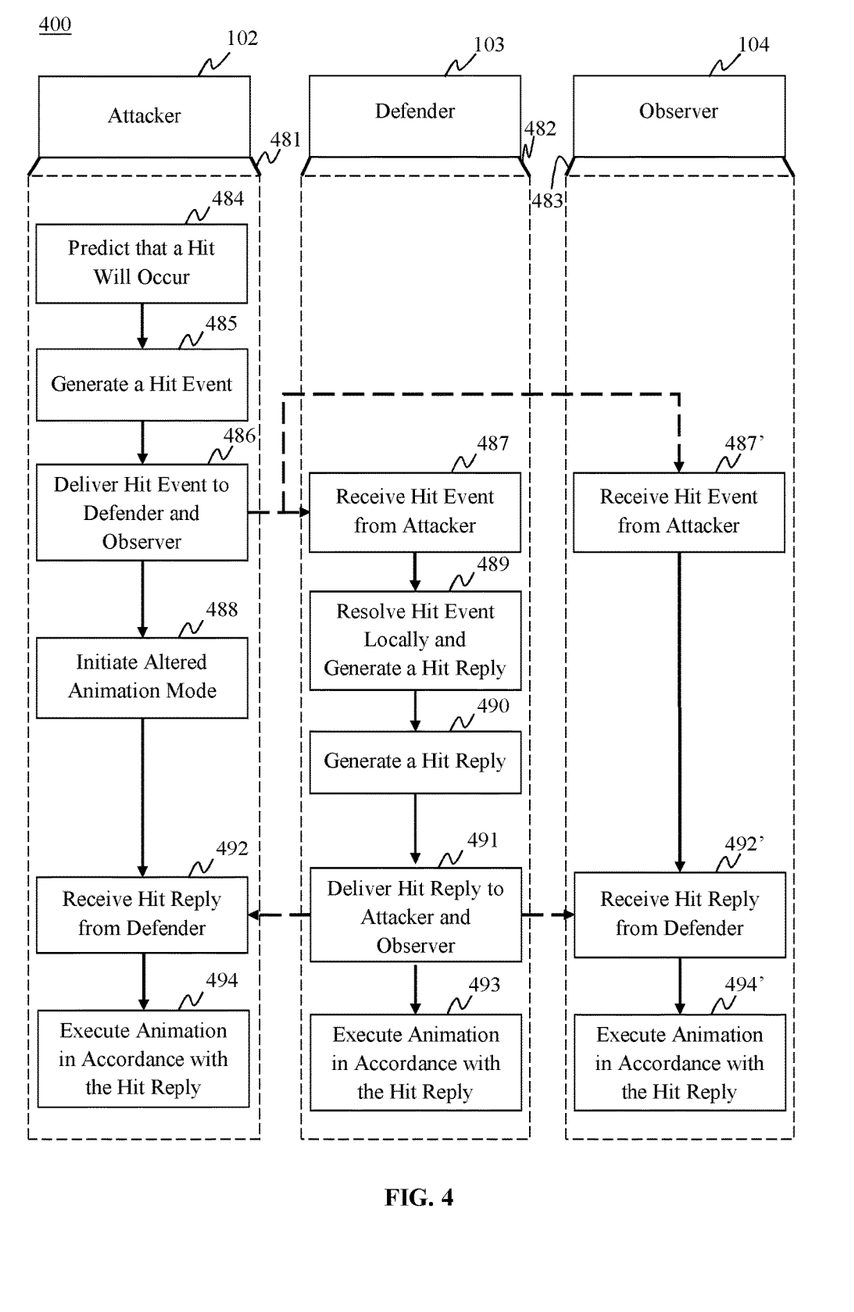
FIG. 4 is a flow diagram illustrating a method of hiding latency according to an aspect of the present disclosure.

As shown in FIG. 4, the attacker 102 and the defender 103 may be configured to implement a method for hiding latencies in a multi-player game according to an inventive method 400. Various aspects of the method 400 may be implemented by execution of computer executable instructions running on the attacker 102 the defender 103 and/or the observer 104. Specifically, an attacker 102 may be configured, e.g., by suitable programming, to implement certain attacker instructions 481. In addition, a defender 103 may be configured to implement certain defender instructions 482. Further, an observer 104 may be configured to implement certain observer instructions 483. In FIG. 4 the dashed arrows represent the flow of data between the attacker 102, the defender 103, and/or the observer 104 over the network 160.

Initially, at 484 the attacker 102 may predict that one or more attack actions initiated by the attacker 102 will likely result in a successful attack against the defender 103. Thereafter, the attacker 102 may generate a hit event 230 at block 485. The hit event may comprise the one or more attack actions and a unique hit ID. Additionally, the hit event 230 may be stored in a hit table 235 located on the attacker 102. The attacker 102 may then deliver the hit event 230 to the defender 103 and the observer 104 at block 486. In order to provide more available time for hiding potential latencies in the data transfers between the attacker 102 and the defender 103, the attacker may initiate an altered animation mode at 488. The altered animation mode may comprise utilizing an extended hit-pause period 315 and/or adding a supplemental hit-pause period 316 after the hit-pause period 313 has expired if more time is needed to hide latency. While the attacker 102 is in the altered animation mode, the defender 103 may receive the hit event 230 at block 487. The defender 103 may also store the hit event 230 in a hit table 235 located on the defender. Similarly, the observer 104 may receive event 230 at block 487' and store the hit event on a local hit table 235. Upon receipt of the hit event, the defender 103 may determine if the hit event 230 will result in a successful or unsuccessful attack on the defender 103 at block 489. After resolving the hit event 230, the defender may generate a hit reply 231 at block 490. The hit reply 230 may comprise information identifying the one or more reply animations that should be displayed in accordance with the success or failure of the one or more attack animations. The hit reply 231 may further comprise the hit ID that was associated with the hit event 230. The defender 102 may also store the hit reply in its local hit table 235. At block 491 the defender 103 may then deliver the hit reply 231 to the attacker 102 and the observer 104 over the network 160. The attacker 102 receives the hit reply 231 at block 492 and may store the hit event 231 in the attacker's local hit table 235. Likewise, the observer 104 may receive the hit reply 231 at block 492' and may store the hit event 231 in the observer's local hit table 235. The hit reply 231 may be received by the attacker 102 before the extended pre-hit period 316 has finished, during the hit-pause period 313, during the extended hit-pause period 316. If the hit reply 231 has not been received before the extended hit-pause period 316 has expired, then an assumed hit reply 231' may be generated by the attacker 102. The assumed hit reply 231' may ideally, but not necessarily, assume that the one or more attack actions did not produce a successful attack. At block 493, the defender 103 may execute the one or more reply animations in accordance with the information included in the hit reply 231. At block 494, the attacker 102 may execute the one or more reply animations in accordance with the information included in the hit reply 231. At block 494' the observer 104 may execute the one or more reply animations in a manner substantially similar to that of the attacker 102. For each of the client device platforms 102, 103, and 104 the transition from the hit-pause period 313 (or the extended hit-pause period 316) to the reply animation period 314 may be made once they have determined that, according to their local information, the hit-pause period 313 (or the extended hit-pause period 316) have completed, and that they have received the defender's 102 broadcast his local avatar has completed the hit-pause 313 period as well.

Figure 5A:
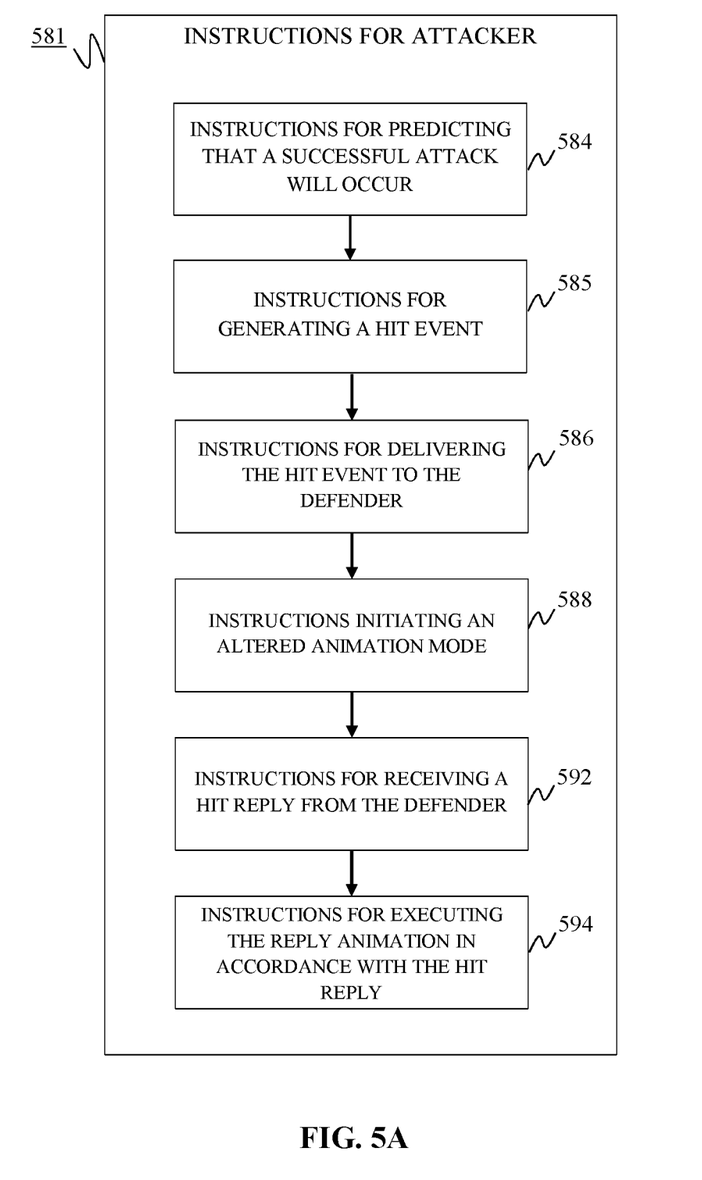
FIGS. 5A-5C are block diagrams describing the directions for how the attacker, defender, and observer hide latency according to various aspects of the present disclosure.

As shown in FIG. 5A, a set of attacker instructions 581 may be implemented e.g., by the attacker 102. The attacker instructions 581 may be formed on a nontransitory computer readable medium such as a memory 132 or the mass storage device 134. The attacker instructions 581 may also be part of the process control program 133. At 584 the instructions may include instructions for predicting that a successful attack will be made against the defender 102. Next, at 585 the attacker 102 may be instructed to generate a hit event 230. The instructions 581 may then have the attacker 102 deliver the hit event 230 to the defender 103 and the observer 104. Thereafter, the attacker 102 may be instructed to initiate an altered animation mode at 588. At 593 the attacker may be provided with instructions for receiving a hit reply 231 from the defender 103. Finally, the attacker 102 may be instructed to execute the one or more reply animations in accordance with the hit reply 231 at 594.

Figure 5B:
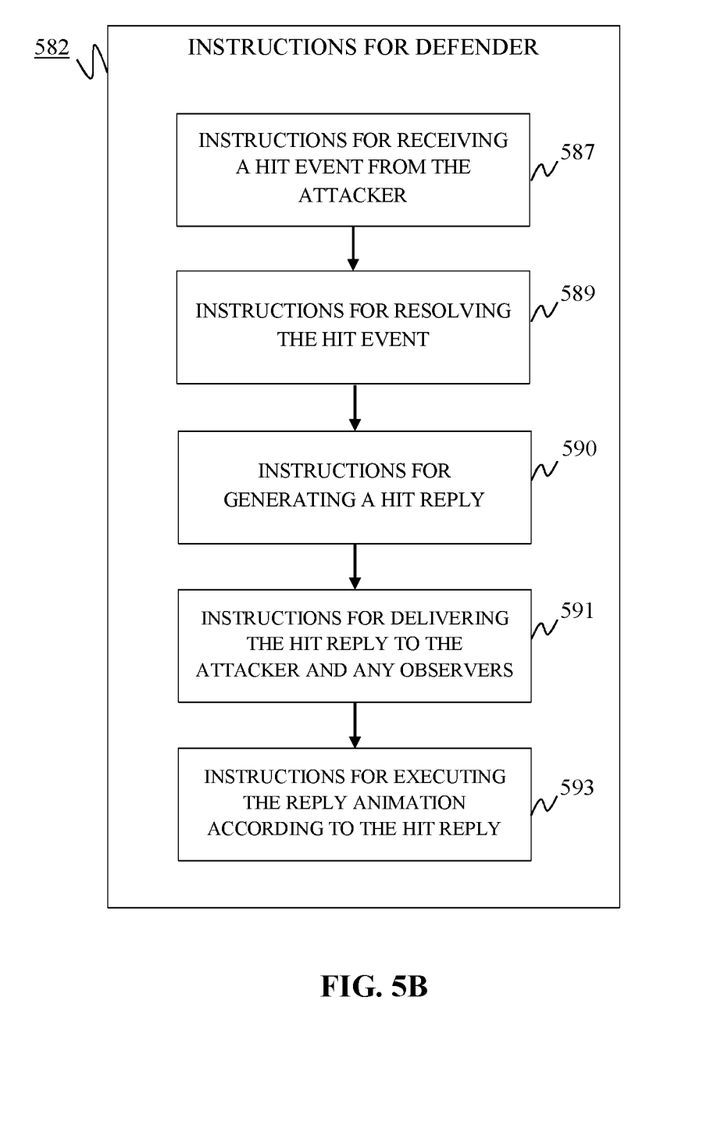

As shown in FIG. 5B, a set of defender instructions 582 may be implemented e.g., by the defender 103. The defender instructions 582 may be formed on a nontransitory computer readable medium such as a memory 132' or the mass storage device 134'. The defender instructions 582 may also be part of the process control program 133'. At 587 the defender instructions 582 may include instructions for receiving a hit event 230 from the attacker 102. Upon receipt of the hit event 230, the defender 103 may be instructed to resolve the hit event 230 locally in order to determine if the one or more attack actions that were included in the hit event 230 result in a successful or an unsuccessful attack against the defender 103 at 589. Next, at 590 the defender 103 may be provided with instructions for generating a hit reply 231. The instructions then may direct the defender 102 to deliver the hit reply 231 to the attacker 102 and the observer 103 at 591. Finally, at 493 the defender 103 may be instructed to execute the one or more reply animations that may be present in the hit reply 231.

Figure 5C:
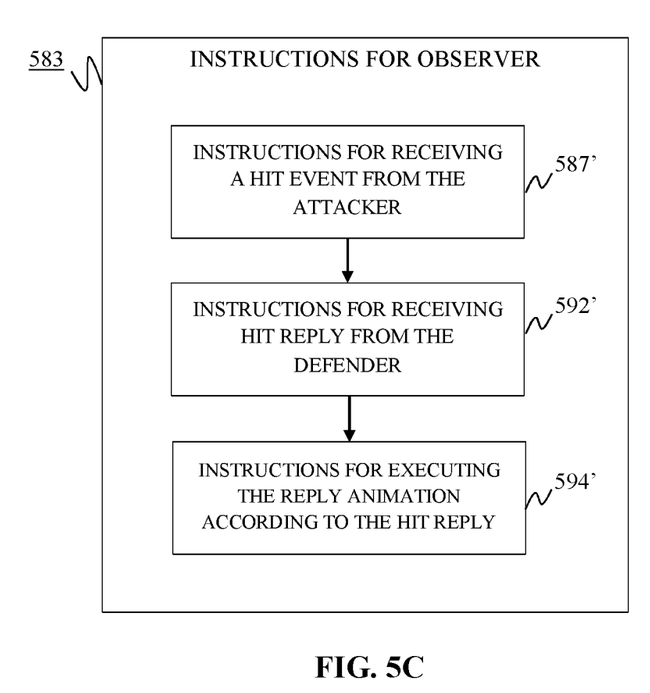

As shown in FIG. 5C, a set of observer instructions 583 may be implemented e.g., by the observer 104. The defender instructions 583 may be formed on a nontransitory computer readable medium such as a memory 132" or the mass storage device 134". The observer instructions 583 may also be part of the process control program 133". At 587' the observer instructions 583 may include instructions for receiving a hit event 230 from the attacker 102. Thereafter, at 592' the observer 104 may be instructed to receive a hit reply 231 from the defender 103. Finally, at 594' the observer 104 may be instructed to execute the one or more reply animations that may be present in the hit reply 231.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. On an attacking client device platform configured to operate on a network, a method for hiding latency during an interaction between the attacking client device and a defending client device in a multiplayer game played over the network, comprising:
   a) predicting that one or more attack animations may result in a successful attack and generating a corresponding hit event;
   b) delivering the hit event to at least the defending client device platform over the network connection;
   c) initiating an altered animation mode during the display of the one or more attack animations on the attacking client device platform having a slowed down playback rate during a pre-hit period for the attacking client device, wherein the attacking client device platform ignores positional updates received from the defending client platform until a hit reply is received and the pre-hit period has finished;
   d) receiving a hit reply from the defending client device over the network connection containing information identifying one or more reply animations; and
   e) displaying the one or more reply animations period after displaying the one or more attack animations having the slowed down playback rate and wherein a position of the one or more reply animations is interpolated to match a latest positional update received from the defending client platform.

2. The method of claim 1, wherein the hit reply is received before an end of the one or more attack animations having the slowed down playback rate.

3. The method of claim 1, wherein the one or more attack animations further comprise a hit-pause period, wherein the hit-pause period begins after the pre-hit period has ended.

4. The method of claim 3, wherein the hit reply is received after the extended pre-hit period has ended.

5. The method of claim 4, further comprising:
   implementing a supplemental hit-pause period, wherein the supplemental hit-pause period is added after hit-pause period.

6. The method of claim 5, wherein the supplemental hit-pause period extends a length of time until the hit reply is received.

7. The method of claim 5, wherein supplemental hit-pause period extends a length of time until a predetermined timeout period has elapsed.

8. The method of claim 7, further comprising:
   deleting all data corresponding to the hit ID, and replacing the reply animation with a timeout animation when the predetermined timeout period has elapsed before the hit reply is received.

9. The method of claim 8, wherein the timeout animation corresponds to a missed attack.

10. The method of claim 1, further comprising:
    delivering the hit event to an observing client device platform.

11. The method of claim 1 wherein the hit event of a) is identified by a unique hit identifier (ID) comprising at least a random access component and a modulo component and wherein the hit reply at d) is identified with the same unique hit ID as in a).

12. The method of claim 1 wherein the attacking client device platform and the defending client device platform are peers in a peer to peer network application.

13. An attacking client device platform configured to operate on a network, comprising:
    a processor;
    a memory coupled to the processor;
    one or more instructions embodied in memory for execution by the processor, the instructions being configured for hiding latency during an interaction between the attacking client device platform and a defending client device platform in a multiplayer game played over the network, the method comprising:
    a) predicting that one or more attack animations may result in a successful attack and generating a corresponding hit event;
    b) delivering the hit event to at least the defending client device platform over the network connection;
    c) displaying the one or more attack animations on the attacking client device platform with a slowed down playback rate during a pre-hit period wherein the attacking client device platform ignores positional updates received from the defending client platform until a hit reply is received and the pre-hit period has finished;

d) receiving a hit reply from the defending client device over the network connection containing information identifying one or more reply animations; and e) displaying the one or more reply animations period after displaying the one or more attack animations with the slowed down playback rate and wherein a position of the one or more reply animations is interpolated to match a latest positional update received from the defending client platform.

14. A nontransitory computer readable medium containing program instructions for hiding latency during an interaction between an attacking client device and a defending client device in a multiplayer game played over the network, and wherein execution of the program instructions by one or more processors of a computer system causes the one or more processors to carry out the steps of:

a) predicting that one or more attack animations may result in a successful attack and generating a corresponding hit event;

b) delivering the hit event to at least the defending client device platform over the network connection;

c) displaying the one or more attack animations on the attacking client device platform with a slowed down playback rate during a pre-hit period wherein the attacking client device platform ignores positional updates received from the defending client platform until a hit reply is received and the pre-hit period has finished;

d) receiving a hit reply from the defending client device over the network connection containing information identifying one or more reply animations; and e) displaying the one or more reply animations period after displaying the one or more attack animations with the slowed down playback rate and wherein a position of the one or more reply animations is interpolated to match a latest positional update received from the defending client platform.

15. In a defending client device platform configured to operate on a network, a method for hiding latency during an interaction between an attacking client device and the defending client device in a multiplayer game played over the network, comprising:

a) receiving a hit event from the attacking client device over the network, wherein the hit event corresponds to one or more attack animations and wherein blocking and/or avoidance animations are disabled after receipt of the hit event;

b) determining if the hit event resulted in a successful attack;

c) generating a hit reply, wherein the hit reply comprises information identifying one or more reply animations;

d) delivering the hit reply to at least the attacking client device; and e) displaying the one or more reply animations after the one or more attack animations.

16. A nontransitory computer readable medium containing program instructions for hiding latency during an interaction between an attacking client device and a defending client device in a multiplayer game played over the network, and wherein execution of the program instructions by one or more processors of a computer system causes the one or more processors to carry out the steps of:

a) receiving a hit event from the attacking client device over the network, wherein the hit event corresponds to one or more attack animations and wherein blocking and/or avoidance animations are disabled after receipt of the hit event;

b) determining if the hit event resulted in a successful attack;

c) generating a hit reply, wherein the hit reply comprises information identifying one or more reply animations;

d) delivering the hit reply to at least the attacking client device; and e) displaying the one or more reply animations after the one or more attack animations.

17. A defending client device platform configured to operate on a network, comprising:

a processor;

a memory coupled to the processor;

one or more instructions embodied in memory for execution by the processor, the instructions being configured to hide latency during an interaction between an attacking client device and the defending client device in a multiplayer game played over the network, the method comprising:

a) receiving a hit event from the attacking client device over the network, wherein the hit event corresponds to one or more attack animations and wherein blocking and/or avoidance animations are disabled after receipt of the hit event;

b) determining if the hit event resulted in a successful attack;

c) generating a hit reply, wherein the hit reply comprises information identifying one or more reply animations;

d) delivering the hit reply to at least the attacking client device; and e) displaying the one or more reply animations after the one or more attack animations.

18. In an observing client device configured to operate on a network, a method for hiding latency during an interaction between an attacking client device and a defending client device in a multiplayer game played over the network, comprising:

a) receiving a hit event from the attacking client device platform over the network, wherein the hit event corresponds to one or more attack animations, and wherein the hit event indicates when animations should be initiated and ceased, wherein the observing client device platform ignores positional updates received from the defending client platform until a hit reply is received and the pre-hit period has finished;

b) receiving a hit reply from the defending client device over the network connection; wherein the hit reply determines whether a successful attack was made; and includes information identifying one or more reply animations; and c) displaying the one or more reply animations after the observing client device determines that the one or more attack animations have finished and receives a signal from the defending client device indicating initiation of a reply animation period and wherein a position of the one or more reply animations is interpolated to match a latest positional update received from the defending client platform.

19. A nontransitory computer readable medium containing program instructions for hiding latency during an interaction between an attacking client device and a defending client device in a multiplayer game played over the network, and wherein execution of the program instructions by one or more processors of a computer system causes the one or more processors to carry out the steps of:
 a) receiving a hit event from the attacking client device platform over the network, wherein the hit event corresponds to one or more attack animations, and wherein the hit event indicates when animations should be initiated and ceased, wherein the observing client device platform ignores positional updates received from the defending client platform until a hit reply is received and the pre-hit period has finished;
 b) receiving a hit reply from the defending client device over the network connection; wherein the hit reply determines whether a successful attack was made; and includes information identifying one or more reply animations; and
 c) displaying the one or more reply animations after the observing client device determines that the one or more attack animations have finished and receives a signal from the defending client device indicating initiation of a reply animation period and wherein a position of the one or more reply animations is interpolated to match a latest positional update received from the defending client platform.

20. An observing client device platform configured to operate on a network, comprising:
 a processor;
 a memory coupled to the processor;
 one or more instructions embodied in memory for execution by the processor, the instructions being configured to hide latency during an interaction between an attacking client device and a defending client device in a multiplayer game played over the network, the method comprising:
 a) receiving a hit event from the attacking client device platform over the network, wherein the hit event corresponds to one or more attack animations, and wherein the hit event indicates when animations should be initiated and ceased, wherein the observing client device platform ignores positional updates received from the defending client platform until a hit reply is received and the pre-hit period has finished;
 b) receiving a hit reply from the defending client device over the network connection; wherein the hit reply determines whether a successful attack was made; and includes information identifying one or more reply animations; and
 c) displaying the one or more reply animations after the observing client device determines that the one or more attack animations have finished and receives a signal from the defending client device indicating initiation of a reply animation period and wherein a position of the one or more reply animations is interpolated to match a latest positional update received from the defending client platform.

\* \* \* \* \*